(12) United States Patent
Katsumata

(10) Patent No.: US 8,009,393 B2
(45) Date of Patent: Aug. 30, 2011

(54) THERMOELECTRIC DEVICE UTILIZED AS VOLTAGE SNUBBER

(75) Inventor: Shin Katsumata, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 18 days.

(21) Appl. No.: 12/555,180

(22) Filed: Sep. 8, 2009

(65) Prior Publication Data

US 2011/0058284 A1    Mar. 10, 2011

(51) Int. Cl.
*H02H 7/00* (2006.01)
*H02H 9/00* (2006.01)
*F25B 21/02* (2006.01)

(52) U.S. Cl. .......................................... 361/18; 62/3.2

(58) Field of Classification Search .......... 136/203–204, 136/211–212
See application file for complete search history.

(56) References Cited

U.S. PATENT DOCUMENTS

| | | | |
|---|---|---|---|
| 4,872,828 A | 10/1989 | Mierzwinski et al. | |
| 4,955,806 A | 9/1990 | Grunden et al. | |
| 5,682,748 A | 11/1997 | De Vilbiss et al. | |
| 5,689,957 A | 11/1997 | De Vilbiss et al. | |
| 6,411,109 B1 | 6/2002 | Hanson | |
| 6,841,124 B2 | 1/2005 | Chien et al. | |
| 6,871,409 B2 | 3/2005 | Robb et al. | |
| 7,069,660 B2 | 7/2006 | Robb et al. | |
| 7,134,279 B2 | 11/2006 | White et al. | |
| 7,558,036 B2 | 7/2009 | Wardzala | |
| 2008/0314430 A1* | 12/2008 | Ghoshal | 136/201 |

* cited by examiner

*Primary Examiner* — Dharti H Patel
(74) *Attorney, Agent, or Firm* — Carlson, Gaskey & Olds

(57) ABSTRACT

An electric circuit includes a plurality of electric circuit elements. The circuit is prone to creating voltage spikes on a pair of spaced lines. A jumper line connects the pair of spaced lines. A thermoelectric element is connected on the jumper line such that the voltage spike will pass through a hot node on the thermoelectric element. A cool node of the thermoelectric element is positioned adjacent to components which require cooling.

15 Claims, 2 Drawing Sheets

THERMOELECTRIC DEVICE UTILIZED AS VOLTAGE SNUBBER

This invention was made with government support under Contract No. FA8650-07-2-2739 awarded by the United States Air Force. The Government may therefore have certain rights in this invention.

BACKGROUND OF THE INVENTION

This application relates to the use of a thermoelectric component as a voltage snubber in an electric circuit.

Electric circuits are becoming increasingly complex. As an example, electric circuits are utilized as power switching devices for switching power such as three-phase power being supplied to a motor. So-called power modules are known that include a plurality of switches, which are alternatively turned on and off to control the passage of power from a power supply to a device such as a motor. Within such circuits, some elements become hot and require cooling. Typically, additional components are required to provide the cooling.

Another concern with many circuits is that there are often transient voltage spikes. A voltage spike is typically dissipated by a snubber circuit. Typically, a resistor and/or a capacitor is utilized to dissipate the voltage spike. A resistor used in such a circuit will provide an additional source of heat in the circuit.

Thermoelectric devices are known and have a hot node and a cool node. When current is passed through one of the two nodes, heat travels toward the other. Thus, thermoelectric devices can be utilized for heating or cooling devices.

A typical thermoelectric cooler consists of an array of P-type and N-type semiconductor elements that act as the two dissimilar conductors. The P-type material has an insufficient number of electrons and the N-type material has extra electrons. These electrons in the N-type material and so-called "holes" in the P-type material, in addition to carrying an electric current, become a transport media to move the heat from the cold junction to the hot junction. The heat transport rate depends on the current passing through the circuit and the number of moving electron-hole couples. As an electric current is passed through one or more pairs of P-N elements, there is a decrease in temperature at the cold junction resulting in the absorption of heat from the object to be cooled. The heat is carried through the thermoelectric cooler by electron transport and released at the hot junction as the electrons move from a high to a low energy state.

SUMMARY OF THE INVENTION

An electric circuit includes a plurality of electric circuit elements. The circuit is prone to creating voltage spikes on a pair of spaced lines. A jumper line connects the pair of spaced power lines. A thermoelectric device is connected on the jumper line such that a voltage spike will pass through a hot node on the thermoelectric element. A cool node of the thermoelectric element is positioned adjacent to components which require cooling.

These and other features of the present invention can be best understood from the following specification and drawings, the following of which is a brief description.

DETAILED DESCRIPTION OF THE PREFERRED EMBODIMENT

Figure 1A:
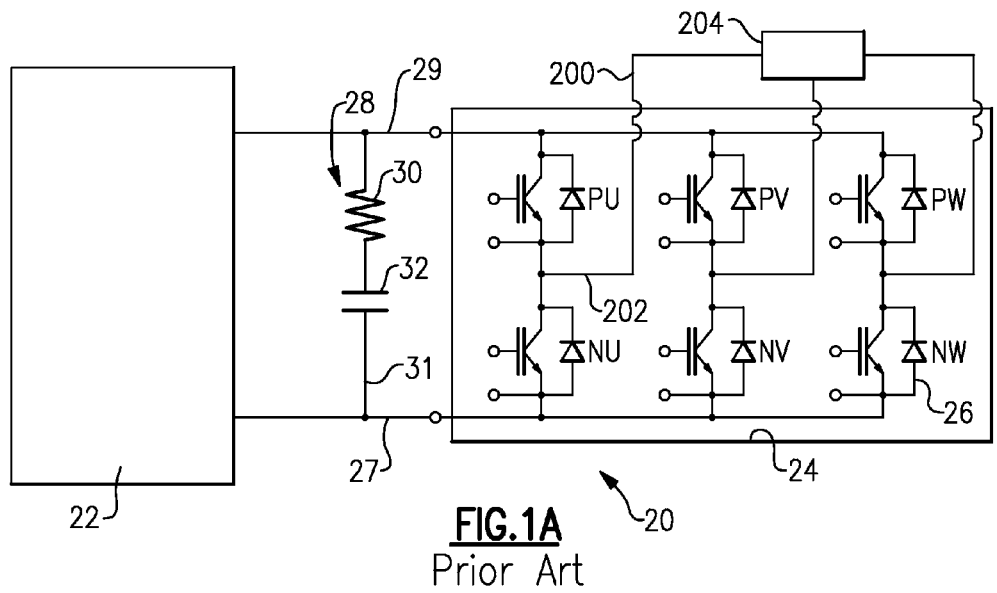
FIG. 1A shows a prior art electric circuit.

FIG. 1A shows a prior art circuit 20 which may be a power supply for a component 22, such as a motor. A six-pack power module 24 includes six switches, which may be MOSFETs 26. These switches are controlled in series to supply three-phase power from a voltage source to the motor 22. As the switching occurs, there may sometimes be a voltage spike applied on the power lines 29 and 27 passing to the component 22. A jumper line 31 connects the lines 27 and 29, and may be provided with a resistor 30, a capacitor 32, or both. These components together form a snubber circuit 28. The snubber circuit will dissipate the voltage spike, as known. In the prior art circuit, the resistor and capacitor only perform the function of dissipating the voltage spike.

A voltage source 204 is shown connected to nodes 202 in the power module 24 and connected through line 200. As known, the power module 24 switches the supply of power from the voltage source 24 to the lines 27 and 29. As mentioned above, during this transfer of power, voltage spikes may occur.

Figure 1B:
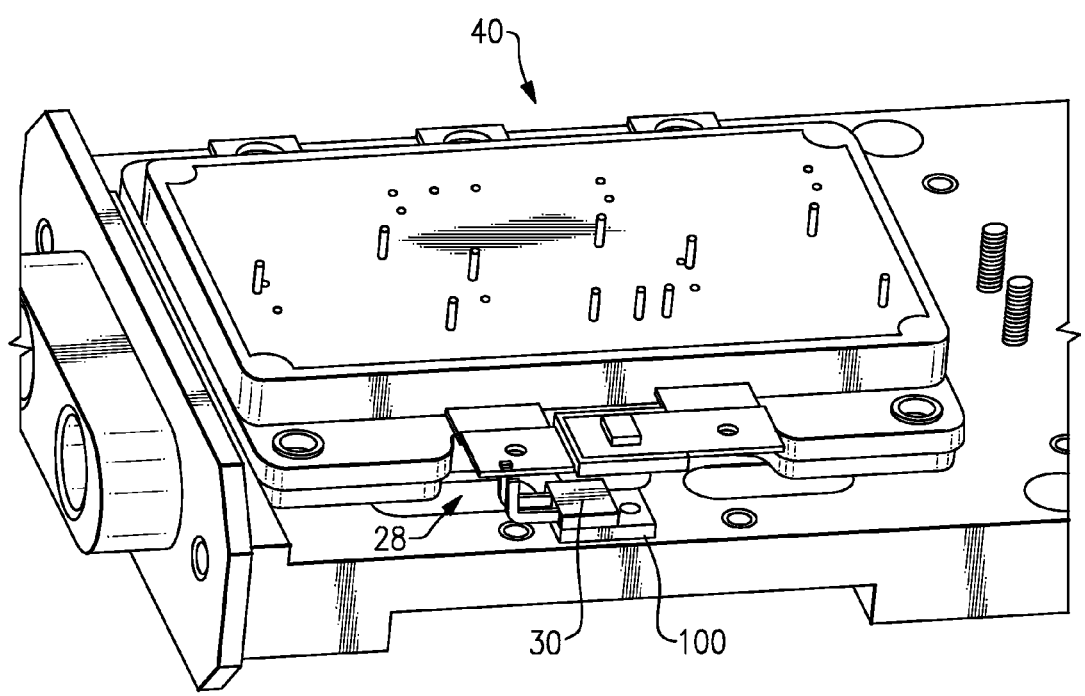
FIG. 1B is a mechanical view of the FIG. 1A circuit.

FIG. 1B is a mechanical view of the snubber circuit 28, and the remaining circuitry 40 which is mounted adjacent to the component. Typically, a cold plate 100 is included to take heat away from the resistor 30, as an example.

Figure 2:
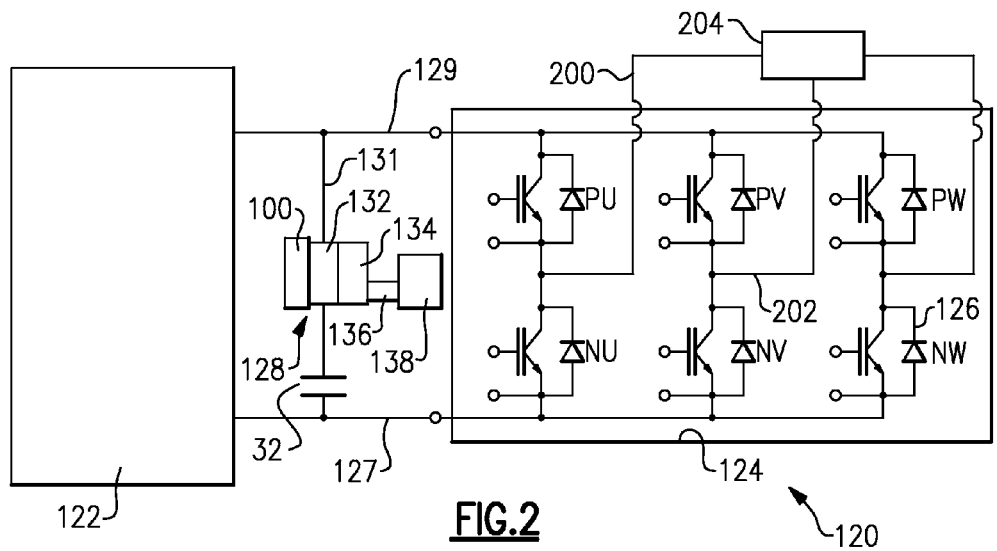
FIG. 2 shows a schematic of an inventive circuit.

FIG. 2 utilizes a thermoelectric cooling element as the snubber, and thus provides synergistic benefits to the overall circuit 120. In circuit 120, components that are similar to the FIG. 1A circuit are labeled with the same numeral, only increased by one-hundred. In the circuit 120, the power lines 127 and 129 are again connected by a jumper line 131. However, line 131 passes through the hot node 132 of a thermoelectric cooling element 128. By passing a current through the hot node 132 when the voltage spike occurs, heat is drawn from a cool node 134 to the hot node 132. As shown in the FIG. 2, somewhat schematically, a heat strap 136, which is essentially a material having good thermal conduction characteristics, is connected to a component 138, which is to be cooled. Component 138 may be any number of electronic components associated with the overall circuit. Rather than simply losing heat from a resistor when a voltage spike is dissipated, the voltage spike actually is utilized to perform the additional function of cooling the component 138. A capacitor 32 is also included in the circuit.

While the invention is shown in a particular circuit, it will have application in any circuit wherein voltage spikes are to be dissipated. As an example, the component 128 can be the power module 124, or a DC bus providing DC power to other components. In addition, any number of circuits may generate the voltage spike.

While a heat strap 136 is directly connected to the component 138, the cool node 134 may simply operate on its own to cool the component 138. In addition, a cool plate 100 may be attached to the hot node 132 to dissipate heat from the hot node.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An electric circuit comprising:
a circuit including plurality of electric circuit elements, and said circuit being prone to creating voltage spikes on a pair of spaced lines;
a jumper line connecting the pair of spaced lines; and
a thermoelectric device connected on said jumper line such that a voltage spike will pass through said thermoelectric device, and a cool node of said thermoelectric device being positioned adjacent to a first component to be cooled.

2. The circuit as set forth in claim 1, wherein said circuit elements include a plurality of switches, and said circuit is a power module for supplying power to a second component.

3. The circuit as set forth in claim 2, wherein said switches are MOSFETs.

4. The circuit as set forth in claim 1, wherein said cool node is connected to the first component by a solid element formed of a material selected to have good conduction characteristics.

5. The circuit as set forth in claim 1, wherein a cool plate is connected to a hot node of the thermoelectric divice.

6. The circuit as set forth in claim 1, wherein said spaced lines are power lines for communicating a power source to the first component.

7. The circuit as set forth in claim 6, wherein said first and second component are the same component.

8. The circuit as set forth in claim 6, wherein the first component is a motor.

9. A power supply for a component comprising:
a voltage source for supplying voltage to a first component, and through a power switching module;
said power switching module incorporating a plurality of switches, and for providing power from said voltage source to a pair of spaced power lines; and
said circuit being prone to creating voltage spikes on the pair of spaced power lines, a jumper line connecting said pair of spaced power lines, a thermoelectric device connected on said jumper line such that a voltage spike will pass through said thermoelectric device, and transfer heat from a hot node to a cool node of said thermoelectric device being positioned adjacent to a second component to be cooled, and a capacitor on said jumper line.

10. The supply as set forth in claim 9, wherein said switches are MOSFETs.

11. The supply as set forth in claim 9, wherein said cool node is connected to the second component by a solid element formed of a material selected to have good conduction characteristics.

12. The supply as set forth in claim 9, wherein a cool plate is connected to the hot node.

13. The supply as set forth in claim 9, wherein the first electrical component is a motor.

14. The supply as set forth in claim 9, wherein said spaced lines are power lines for communicating a power source to the first component.

15. The supply as set forth in claim 14, wherein said first and second component are the same component.

* * * * *